United States Patent Office 3,004,033
Patented Oct. 10, 1961

3,004,033
2-(2,5-DIHYDROXYPHENYLTHIO)
THIAZOLECARBOXYLATES
John J. D'Amico, Charleston, W. Va., assignor to Monsanto Chemical Company, St. Louis, Mo., a corporation of Delaware
No Drawing. Filed Dec. 23, 1959, Ser. No. 861,444
7 Claims. (Cl. 260—302)

This invention relates to new carboxylic acids and derivatives thereof and more particularly is directed to carboxylic acids, esters, and amides of the general formula

where T represents 2-(2,5-dihydroxyphenylthio)thiazole, which radical may be represented by the general formula

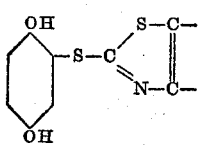

and R represents $NH_2$, anilino, OH or lower alkoxy. The new compounds comprise both 4- and 5-thiazolecarboxylic acids and derivatives. The position of substitution is a matter of indifference. The remaining valence in the thiazole nucleus may be satisfied by hydrogen or lower alkyl.

The new products form readily by reacting, preferably in equimolecular proportions, benzoquinone and the appropriate mercaptothiazolecarboxylic acid or derivative. The invention will be more fully understood from the following specific examples which, however, are presented for illustrative purposes only, and are not to be construed as limiting the invention thereto.

EXAMPLE 1

A suspension of 27 grams (0.25 mole) of benzoquinone in 185 ml. of methyl alcohol was heated to 60° C. and the resulting solution cooled to 0° C. whereupon the p-benzoquinone crystallized. To this slurry at 0° C. was added in one portion a suspension of 50.8 grams (0.25 mole) of ethyl 2-mercapto-4-methyl-5-thiazolecarboxylate in 300 ml. of methyl alcohol. The stirred reaction mixture was held at 0–5° C. for 2 hours and then heated to 60° C. The reaction mixture was filtered hot to remove impurities, the filtrate added to 1000 ml. of hot water and stirred for one-half hour. After cooling to 0–5° C. the solid was filtered and dried. Ethyl 2-(2,5-dihydroxyphenylthio)-4-methyl-5-thiazolecarboxylate was obtained in 93.5% yield as a colorless solid. It melted at 215–217° C. after recrystallization from ethyl acetate. Analysis gave 4.5% nitrogen and 20.4% sulfur as compared to 4.5% nitrogen and 20.6% sulfur calculated for $C_{13}H_{13}NO_4S_2$.

Employing the procedure of Example 1 but replacing ethyl 2-mercapto-4-methyl-5-thiazolecarboxylate with an equimolecular proportion of 2-mercapto-4-methyl-5-thiazolecarboxylic acid, 2 - (2,5 - dihydroxyphenylthio)4-methyl-5-thiazolecarboxylic acid was obtained in 88.7% yield as a white solid melting at 230–232° C. Analysis gave 5.1% nitrogen and 22.2% sulfur as compared to 4.9% nitrogen and 22.6% sulfur calculated for $C_{11}H_9NO_4S_2$

EXAMPLE 2

In the procedure of Example 1, 40.3 grams (0.25 mole) of 2-mercapto-4-thiazolecarboxylic acid was substituted for the 2-mercapto-4-thiazolecarboxylic acid was substituted for the 2-mercapto-4-methyl-5-thiazolecarboxylic acid. The 2-(2,5-dihydroxyphenylthio)-4-thiazolecarboxylic acid so obtained was a black solid melting at 103–105° C. with decomposition. Analysis gave 4.9% nitrogen as compared to 5.2% calculated for $C_{10}H_7NO_4S_2$

EXAMPLE 3

A suspension of 44 grams (0.4 mole) of p-benzoquinone in 300 ml. of methyl alcohol was heated to 60° C. and then cooled to 0° C. To the slurry of crystallized p-benzoquinone was added in one portion 69.6 grams (0.4 mole) of 2-mercapto-4-methyl-5-thiazolecarboxamide in 200 ml. of ethyl alcohol. The stirred reaction mixture was held at 0–5° C. for 2 hours, then heated to 60° C. and isolated as described in Example 1. The 2-(2,5-dihydroxyphenylthio) - 4-methyl-5-thiazolecarboxamide was obtained in 65.6% yield as a dark brown solid melting at 158–160° C. Analysis gave 9.7% nitrogen as compared to 9.9% calculated for $C_{11}H_{10}N_2O_3S_2$.

In the same manner the following compounds were prepared:

Methyl 2 - (2,5-dihydroxyphenylthio) - 4-methyl-5-thiazolecarboxylate from p-benzoquinone and methyl 2-mercapto-4-methyl-5-thiazolecarboxylate, in 79.3% yield as a cream colored solid, M.P. 216–218° C. after recrystallization from ethyl acetate. Analysis gave 4.7% nitrogen, the calculated value for $C_{12}H_{11}NO_4S_2$.

2 - (2,5-dihydroxyphenylthio) - 4-methyl-5-thiazolecarboxanilide from p-benzoquinone and 2-mercapto-4-methyl-5-thiazolecarboxanilide, in 48% yield as a dark brown solid, M.P. 128–130° C. after recrystallization from ethyl acetate-heptane. Analysis gave 7.4% nitrogen and 17.9% sulfur as compared to 7.8% nitrogen and 17.9% sulfur calculated for $C_{17}H_{14}N_2O_3S_2$.

The compounds of this invention possess useful accelerating properties in the vulcanization of sulfur-vulcanizable rubbers coupled with a high degree of processing safety during preliminary mixing and handling steps. The compounds are especially valuable for use in conjunction with basic highly active accelerators possessing low critical temperature. They retard vulcanizing activity of the basic accelerator at mixing temperature but contribute to acceptable physical properties of vulcanizates obtained at conventional curing temperatures. Examples of basic accelerators of the type mentioned are diphenyl guanidine, di-o-tolyl guanidine, buytlaldehyde-aniline, diphenyl guanidine phthalate and the like as auxiliary accelerators. As exemplary of the accelerating activity, vulcanizable compositions were compounded comprising

| Stock | A | B | C |
|---|---|---|---|
| | Parts by weight | | |
| Smoked Sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Phenyl-beta-naphthylamine | 1 | 1 | 1 |
| Sulfur | 2.5 | 2.5 | 2.5 |
| Diphenyl guanidine | 0.2 | 0.2 | 0.2 |
| Product of Example 1 | 0.5 | | |
| Product of Example 2 | | 0.5 | |
| Product of Example 3 | | | 0.5 |

The stocks so compounded were cured in the usual manner by heating in a press for different periods of time at 144° C. The strength of the vulcanizates at 90 minute cure and 300% elongation is set forth below:

Table I

|  | Stock A | Stock B | Stock C |
|---|---|---|---|
| Modulus of Elasticity in lbs./in.² at 300% Elongation | 1,610 | 1,250 | 1,200 |

The processing safety of the uncured compositions was evaluated by means of a Mooney plastometer. The time required for incipient vulcanization or scorch time was taken as the time required for the Mooney plasticity to rise 10 points above the minimum.

Table II

| Stock: | Mooney Scorch in mins. at 135° C. |
|---|---|
| A | 13.6 |
| B | 15.5 |
| C | 16.5 |

The Mooney scorch of a similar stock containing as the accelerator 0.7 part of 2,2'-dithiobis benzothiazole, a commercial delayed action accelerator, was 8.1 minutes at 135° C. A stock containing 0.5 parts of the commercial accelerator and 0.2 parts of diphenyl guanidine had a scorch time of 6.3 minutes.

By the term "sulfur-vulcanizable rubber" as employed in the specification is meant to include synthetic as well as natural rubbers which are capable of vulcanization when heated with sulfur and is intended to includes latices and reclaims thereof whether or not admixed with fillers, softeners, pigments, antioxidants, etc. Butadiene-styrene copolymer rubber, poly-butadiene and polyisoprene rubbers comprise examples of synthetic rubber in which the new compounds are useful. The compounds are also useful as intermediates for synthesis of more complex molecules.

It is intended to cover all changes and modifications of the examples of the invention herein chosen for purposes of disclosure which do not contsitute departure from the spirit and scope of the invention.

What is claimed is:

1. Compounds having the formula where T is a radical

of the structure

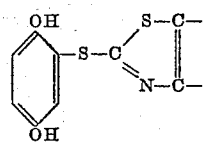

the remaining valence of which is satisfied by a member of the group consisting of hydrogen and lower alkyl and where R is a member of the group consisting of $NH_2$, anilino, hydroxy and lower alkoxy.

2. 2-(2,5-dihydroxyphenylthio) - 4-thiazolecarboxylic acid.

3. 2-(2,5-dihydroxyphenylthio) - 4-methyl-5-thiazolecarboxylic acid.

4. 2-(2,5-dihydroxyphenylthio) - 4-methyl-5-thiazolecarboxanilide.

5. 2-(2,5-dihydroxyphenylthio) - 4-methyl-5-thiazolecarboxamide.

6. Methyl 2 - (2,5-dihydroxyphenylthio)-4-methyl-5-thiazolecarboxylate.

7. Ethyl 2 - (2,5-dihydroxyphenylthio) - 4-methyl-5-thiazolecarboxylate.

References Cited in the file of this patent

UNITED STATES PATENTS

| 2,616,893 | Newby | Nov. 4, 1952 |
| 2,725,382 | Harman | Nov. 29, 1955 |
| 2,769,010 | D'Amico | Oct. 30, 1956 |